Figure 1:
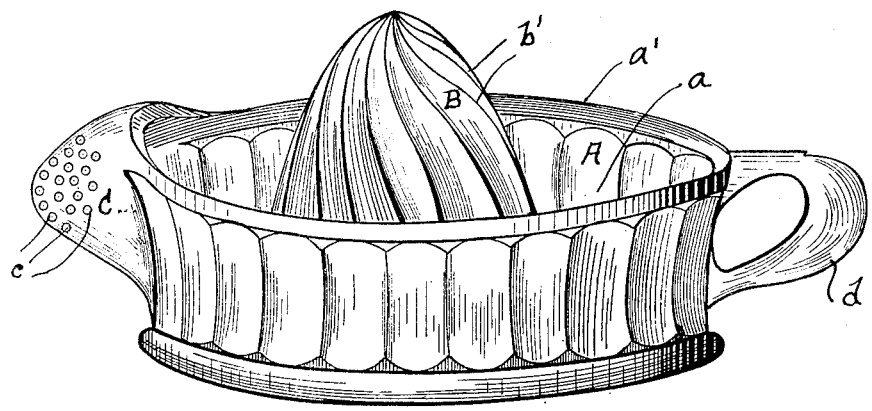

R. STEIN.
FRUIT JUICE EXTRACTOR.
APPLICATION FILED OCT. 30, 1920.

1,411,813.

Patented Apr. 4, 1922.

INVENTOR,
Rose Stein

UNITED STATES PATENT OFFICE.

ROSE STEIN, OF LOS ANGELES, CALIFORNIA.

FRUIT-JUICE EXTRACTOR.

1,411,813.   Specification of Letters Patent.   Patented Apr. 4, 1922.

Application filed October 30, 1920. Serial No. 420,585.

*To all whom it may concern:*

Be it known that I, ROSE STEIN, a citizen of the United States, residing at Los Angeles, in the county of Los Angeles and State of California, have invented new and useful Improvements in Fruit-Juice Extractors, of which the following is a specification.

This invention relates to fruit juice extractors and it has for its object to provide an improved device of the character stated which in addition to an extracting element per se, and a juice receptacle, comprises also a straining element united therewith or formed therewith, to the end that an attractive and convenient utensil is produced, and in which any fruit seeds and pulp in the extracted juice will be retained upon pouring off the juice.

In accordance with the invention, and in the preferred practice thereof, I provide a bowl-like body having a handle or finger piece, an upstanding central extracting element preferably in the form of a fluted cone over which one-half of a lemon or the like may be pressed and rotated to extract the juice, and a juice discharge spout terminating in a strainer to retain such seeds as may be contained in the juice in the bowl.

The entire utensil may be formed integrally as of cast glass, metal, or other suitable material, and is preferably so designed as to be attractive or ornamental in appearance so producing a highly desirable and useful article for either household use or for use at refreshment counters and the like.

With the above and other objects in view, including relative simplicity and inexpensiveness in manufacture, the invention consists in the novel and useful provision, formation, combination and interrelation of parts, all as hereinafter set forth, shown in the drawing, and finally pointed out in claims.

Figure 2:
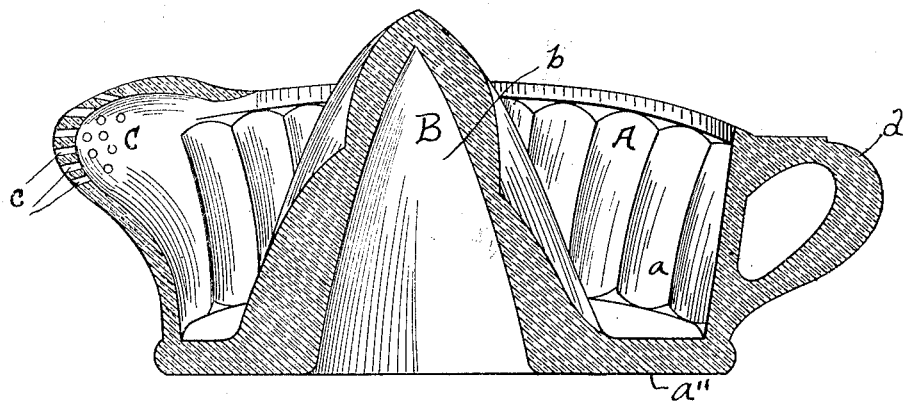

In the drawing:

Figure 1 is a perspective view of an improved utensil embodying my invention; and Figure 2 is a central longitudinal sectional view of the utensil shown in Figure 1.

Corresponding parts in both the figures are designated by the same reference characters.

Referring with particularity to the drawing, in the embodiment of the invention shown therein, A designates a circular bowl-like body or receptable, B designates an extractor cone, and C designates a straining spout.

An annular juice-receiving space $a$ is formed between the side wall $a'$ of the body and the extractor cone B, which cone may be conveniently cast hollow, as at $b$, and may be formed integrally with the other elements of the utensil. As best shown in Figure 2, the cone preferably springs directly from the bottom wall $a''$ of the receptacle body A. The cone B is exteriorly provided with a plurality of integral outstanding spaced knives or ribs $b'$ which may extend downwardly over the surface of the cone, either in straight or curved formation in accordance with the preference of the designer.

The straining spout C is shown as formed at the periphery of the receptacle by distortion of the side wall $a'$, and is preferably in the form of a cone-like chamber or funnel, communicating with the annular space $a$; at its outer or discharge end the spout or strainer element C has a plurality or multiplicity of discharge orifices or perforations $c$ which permit the discharge of the fruit juice therethrough but which are too small to allow the seeds contained in the juice to pass.

The funnel-like spout being closed at all sides and open only where it communicates with the bowl-shaped body and at the orifices provided at its discharge tip, it may be inserted directly into the mouth of a bottle or other juice-receiving vessel, so acting as a funnel as well as strainer.

At a point preferably diametrically opposite the strainer or discharge spout C, the receptacle A is provided with an integrally formed handle or finger piece $d$ which is shown as in the form of a loop to receive a finger.

In the use of my improved utensil, one-half of a cut lemon or other like fruit may be pressed upon the cone and rotated between the fingers, whereupon the juice and seeds will flow into the annular receiving space $a$, from which it may be poured into a glass or other vessel through the straining element C, the pulp and seeds being retained in its spout or receptacle.

Having thus disclosed my invention, I claim and desire to secure by Letters Patent:

1. A fruit juice extractor comprising a bowl-shaped receptacle, an extractor element supported in position to discharge the juice of fruit pressed thereagainst into said receptacle, a handle at the periphery of said bowl-shaped receptacle, and a discharge spout communicating at its one end with said bowl-shaped receptacle and having a plurality of juice discharging apertures at its other end and whereby upon insertion of the extreme outward apertured tip thereof into a vessel strained fruit juice may be directly discharged into the vessel.

2. A fruit juice extractor comprising in integral construction a bowl-shaped receptacle, an upstanding ribbed extractor element in said receptacle, said receptacle having a handle, and a hollow straining discharge spout closed on all sides but communicating at its inner end with said receptacle and having a plurality of fruit juice discharging apertures at its outer end where it is formed for discharging strained fruit juice directly into a vessel.

In testimony whereof, I have signed my name to this specification in the presence of two subscribing witnesses.

ROSE STEIN.

Witnesses:
ALFRED H. DAEHLER,
HUMPHREY MARSHALL.